United States Patent [19]

Hornak

[11] Patent Number: 4,627,142
[45] Date of Patent: Dec. 9, 1986

[54] CRIMPING

[75] Inventor: Leonard P. Hornak, North Huntingdon Township, Irwin County, Pa.

[73] Assignee: Westinghouse Electric Corp., Pittsburgh, Pa.

[21] Appl. No.: 617,855

[22] Filed: Jun. 6, 1984

[51] Int. Cl.⁴ .............................................. B25B 25/00
[52] U.S. Cl. .................................. 29/283.5; 414/753; 414/729; 414/728
[58] Field of Search ...................... 29/727, 283.5, 237; 72/452; 901/18; 414/753, 729, 728

[56] References Cited

U.S. PATENT DOCUMENTS

| | | | |
|---|---|---|---|
| 3,535,952 | 10/1970 | Deval | 414/728 |
| 3,984,009 | 10/1976 | Holroyd | 414/728 |
| 4,229,136 | 10/1980 | Panissidi | 414/753 |
| 4,480,460 | 11/1984 | Bush et al. | 72/452 |

FOREIGN PATENT DOCUMENTS

WO84/317  2/1984  PCT Int'l Appl. ............. 29/283.5

Primary Examiner—Robert C. Watson
Attorney, Agent, or Firm—L. A. DePaul

[57] ABSTRACT

A crimping tool for crimping a locking cap secured to the nut of a new split-pin assembly to the new split-pin to preclude turning of the nut and pin relative to each other. The tool includes a crimping mechanism including crimping jaws having crimping pins face-to-face near one end. The jaws have external cam surfaces. The crimping pins are retracted and brought into crimping engagement with the cap to be crimped by cam followers which traverse the cam surfaces when actuated hydraulically through a C-frame connected to the cam followers. The crimping mechanism is mounted on a support which is moveable by a hydraulic cylinder between a retracted setting, where it is latched generally vertically, and an operating setting where it is positioned generally horizontally. The piston rod of the cylinder has a slotted extension. The slot is engaged by a pin which is connected to the support. By cooperation of the slot and pin the support is pivoted vertically from the retracted position to an intermediate horizontal position during a first part of the stroke of the extension and is pivoted horizontally in position to perform a crimping operation during the last part of the stroke of the extension.

8 Claims, 18 Drawing Figures

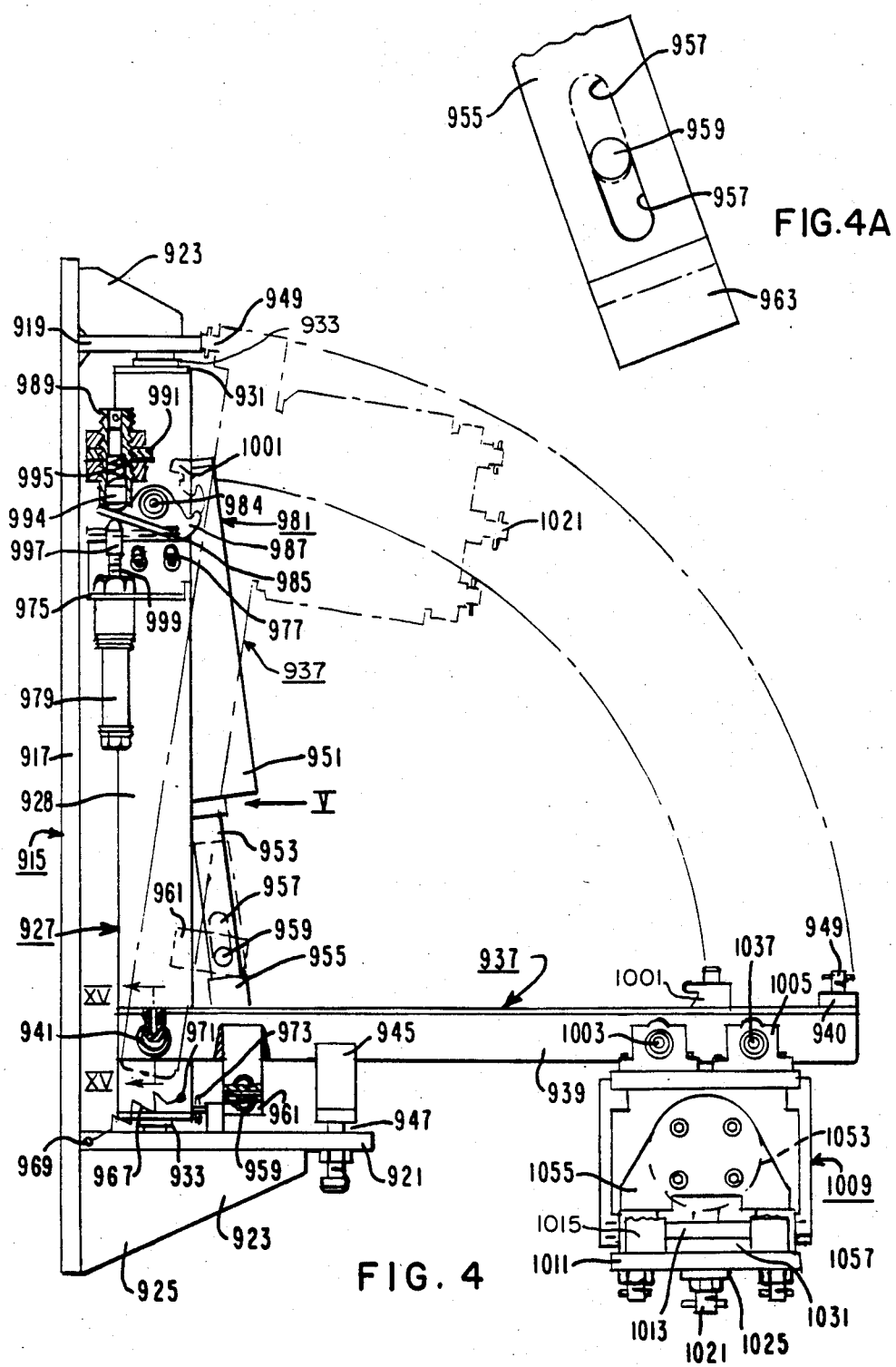

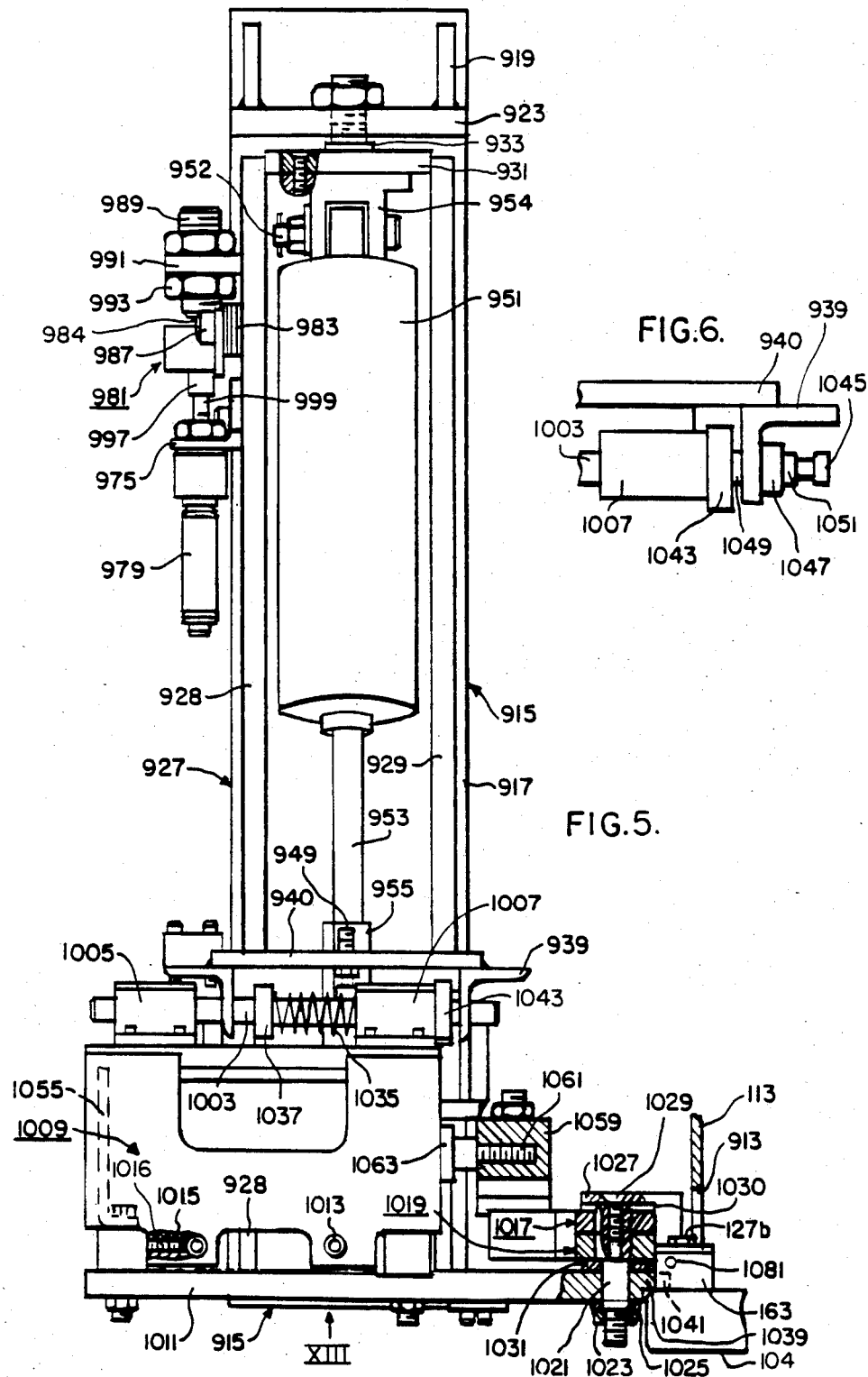

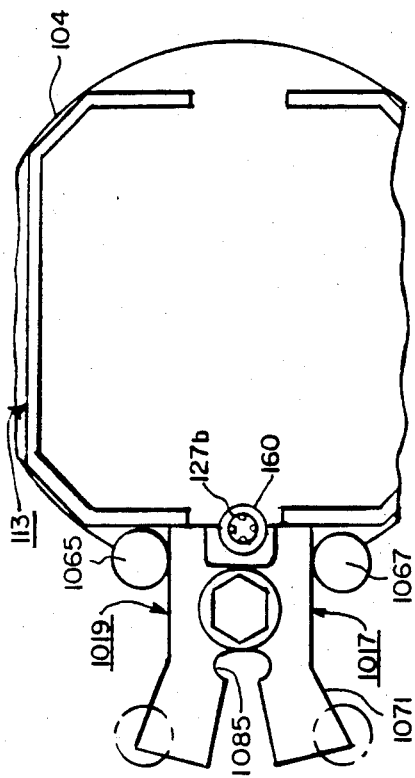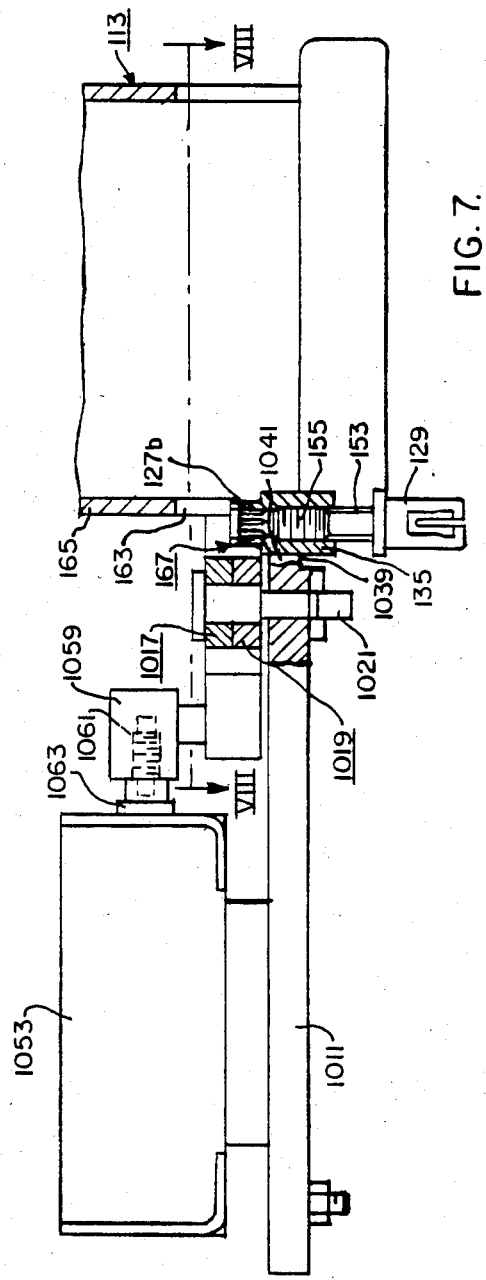

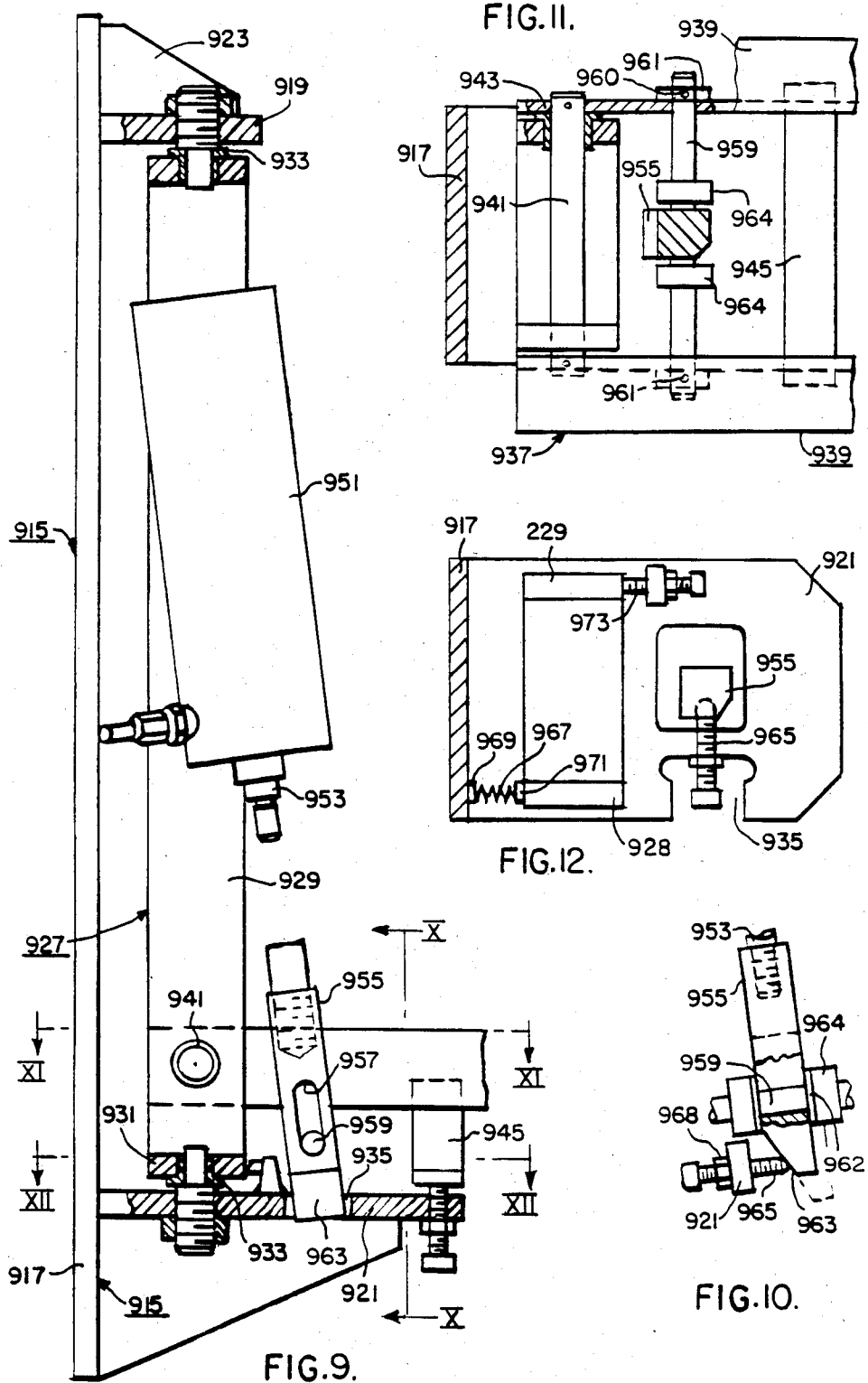

CRIMPING

REFERENCE TO RELATED APPLICATION

Application Ser. No. 576,645 filed Feb. 3, 1984 to John L. Land, Ronald J. Hopkins, and Jose M. Martinez for *Replacement Support Pin for Guide Tubes for Operating Plant* and assigned to Westinghouse Electric Corporation, is incorporated herein by reference.

Application Ser. No. 617,857 filed concurrently herewith to Raymond M. Calfo, George F. Dailey, and Raymond P. Castner for *Replacement of Split Pins in Guide Tubes* (herein Calfo) , assigned to Westinghouse Electric Corporation, is incorporated herein by reference.

BACKGROUND OF THE INVENTION

This invention relates to nuclear reactors and it has particular relationship to the replacement of the old split-pin assemblies of a guide tube of a nuclear reactor by new split-pin assemblies. The reasons for the replacement and the practice of replacing the old split-pin assemblies are described in detail in Calfo. There are usually about 61 guide tubes in a nuclear reactor and all old split-pin assemblies, two in each guide tube, must be replaced. The guide tubes and the old nut and old split pin of the old split-pin assemblies are highly radioactive. To avoid the hazards of radioactivity the replacement is carried out at a substantial depth under borated water by robotic tools controlled from a robotic command center on a deck above the pool. The command center includes a programmable computer. The guide tube includes an upper section and a lower section, the latter being herein referred to as the lower guide tube or LGT. The split-pin assembly is secured in counterbores of the lower flange of the LGT. The assembly includes an old split pin and an old nut. The nut is threaded onto the split pin and seated on the base of the upper counterbore; the pin has a flange which extends into the lower counterbore.

In processing a guide tube for replacement, the LGT is separated from the upper section and transferred to the robotic work station where it is precisely positioned for processing. Next the old split-pin assembly is severed into fragments from the upper and lower counterbores by metal disintegration machining, the fragments are removed, the counterbores are cleaned, a new nut is placed in the upper counterbore, a new split pin is inserted through the lower counterbore and the new nut is torqued onto the new pin and seated on the base of the upper counterbore. At this point it is necessary to secure the new nut and new split pin together so that they do not rotate with reference to each other. In the old split-pin assembly, this object is accomplished by a dowel pin which traverses the nut and pin near their upper ends and is welded to the old nut. The old nut as well as the new nut is composed of AISI type 304 stainless steel or like alloy. This alloy cannot readily be welded under water. During the replacement the welded dowel-pin joint of the old split-pin assembly is replaced by crimped joint. For this purpose the nut is fabricated with a locking cap secured near its upper end and the new split pin is fabricated with an upper stem having grooves, specifically flutes. After the new nut is torqued onto the new split pin and secured in the upper counterbore, the locking cap extends above the new nut opposite to the flutes in the new split pin. It is necessary to crimp the locking cap securely into the flutes so as to preclude rotation of the new nut and pin relative to each other. It is an object of this invention to provide a crimping tool for accomplishing this object.

In creating a crimping tool one is confronted by a number of serious problems. The robotic work station includes six components in addition to the crimping tool It is necessary that the crimping tool shall be capable of effective operation in cooperation with, and within the limited space confines, afforded by the other tools. It is also necessary that the crimping tool be capable of remote control, from the robotic control center, either step-by-step manually or automatically under the commands of a programmable computer.

The new split-pin assembly, as mounted in the lower flange of the LGT, is accessible only over a cylindrical solid angle of about 180° and is not accessible from the top. As mounted in the lower flange of the LGT, the split-pin assembly, old and new, extends into the "mouse hole" of the LGT and is spanned above by the wall of the LGT whose edge bounds the "mouse hole".

It is an object of this invention to overcome the above drawbacks and disadvantages and to provide a crimping tool which shall be capable of effectively crimping the locking cap secured to the new nut of a new split-pin assembly into the grooves or flutes of the new split pin notwithstanding the limited access available to the locking cap. It is also an object of this invention to provide such a tool that shall be capable of effective operation within the confines afforded by the other tools of the robotic work station.

SUMMARY OF THE INVENTION

The crimping tool according to this invention includes a crimping mechanism, and a support for the crimping mechanism. The support is in the standby state of the tool latched in a retracted setting and when unlatched is displaceable to an operating setting in which the crimping mechanism is positioned to carry out a crimping operation on a new split-pin assembly.

The crimping mechanism is an "ice tong" shaped structure having jaws pivotal on a pivot pin. Near one end each jaw is provided internally with a tapered crimping pin. The jaws are mounted on the pivot pin with their crimping pins face-to-face and are moveable between a setting in which the crimping pins are retracted and a setting in which the crimping pins are in crimping position. Externally each jaw has a cam surface. The jaws are mounted on the pivot pin near one end of the support. Inwardly of the jaws the crimping mechanism includes a "C"-shaped frame which straddles the support and is connected to a fluid cylinder which is capable of moving the C-frame forwardly backwardly and along the support. The frame carries cam-follower rollers which engage the cam surfaces on the jaws and, when the "C"-frame is moved by the cylinder, displace the jaws between the retracted setting and the crimping setting.

Typically the support is a cantilever which is latched in vertical position and is mounted pivotal, by a fluid cylinder, both about a horizontal axis and about a vertical axis. When the support is unlatched, it is pivoted vertically about the horizontal axis to a stop, during a part of the stroke of the piston of the cylinder. Then, during a continuation of the stroke of the piston, it is pivoted horizontally about the vertical axis, setting the crimping mechanism in its crimping setting. Then the "C"-frame is actuated by its cylinder to crimp the locking cap to the new split-pin.

A crimping operation is performed by carrying out the following successive steps:

1. The support for the crimping mechanism is unlatched.
2. The support is swung from its retracted or storage position to its operating position.
3. The "C"-frame is actuated to travel forward closing the jaws of the crimping mechanism on the locking cap and crimping the cap into the flutes of the split pin.
4. The "C"-frame is actuated to travel backward, i.e., is retracted, opening the jaws.
5. The crimper-mechanism support is returned to its vertical retracted position.
6. The support is latched in the retracted position.

The principal advantages of the crimper tool according to this invention is that it is capable of being operated by remote control either manually or automatically on commands from a programmable computer. When operated in the manual mode, the crimper tool can recover from abnormal maloperation which may arise during its use. The crimper tool can be aligned in the field prior to its mounting in the robotic work station for operation.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 4 is a view in front elevation of the crimper tool showing the crimper in full lines in the operating position and in broken lines in the retracted position;

FIG. 4A is a fragmental plan view of the extension of the piston rod which positions the crimping mechanism showing the manner in which it operates;

FIG. 5 is a view in side elevation, partly in section of the crimper in operating position taken in the direction V of FIG. 4;

FIG. 6 is a fragmental plan view showing an adjusting structure for the crimping mechanism;

FIG. 7 is a fragmental view in side elevation, and partly in section, of the part of the crimper which performs the crimper operation;

FIG. 8 is a fragmental view in transverse section taken along line VIII—VIII of FIG. 7;

FIG. 9 is a view in front elevation, and partly in section, showing particularly the lower portion of the support for the crimper with the crimper in the retracted position;

FIG. 10 is a fragmental view in side elevation, and partly in section, taken in the direction X—X of FIG. 9 showing the camming action which advances the crimping head of the crimper horizontally;

FIG. 11 is a fragmental view in transverse section taken along line XI—XI of FIG. 9.

FIG. 12 is a fragmental view in transverse section taken along line XII—XII of FIG. 9;

DETAILED DESCRIPTION OF THE PREFERRED EMBODIMENT

Figure 1:
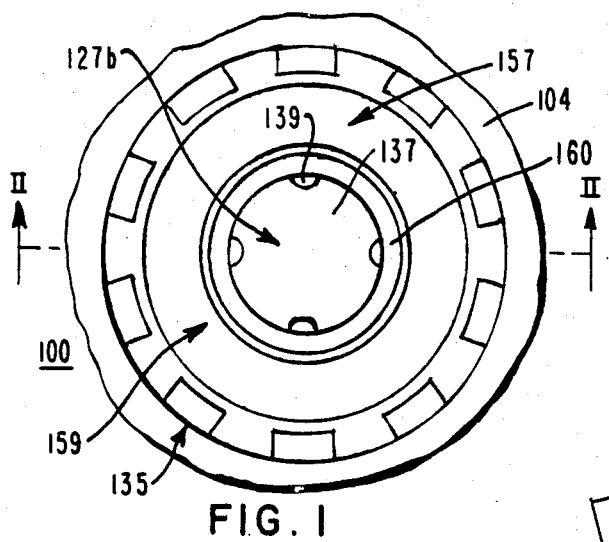
FIG. 1 is a plan view enlarged of a new split-pin assembly which is subjected to a crimping operation in the practice of this invention.
Figure 2:
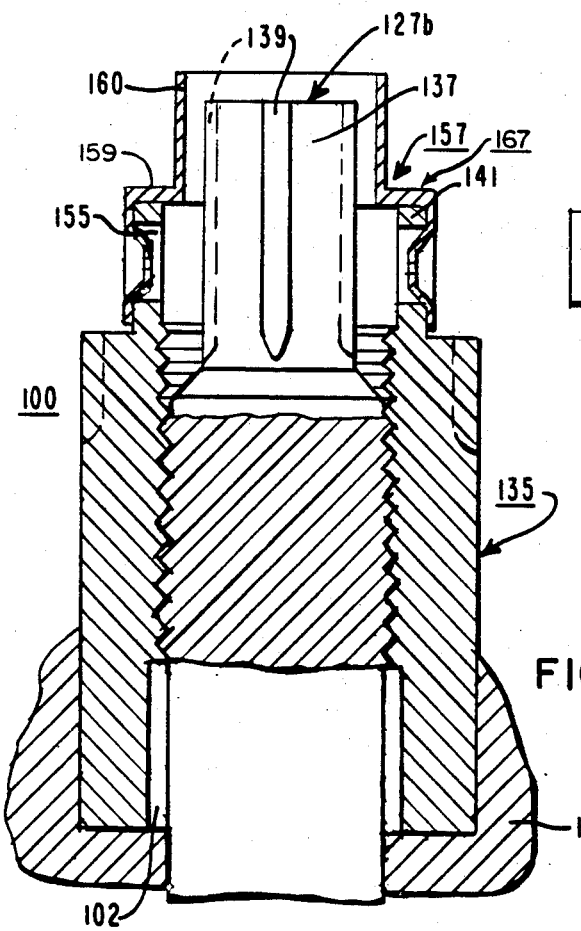
FIG. 2 is a view in section taken along line II—II of FIG. 1.

FIGS. 1 and 2 show a new split-pin assembly 100 mounted on the upper counterbore 102 of the flange 104 of an LGT 113 (FIGS. 7, 8). The split pin assembly 100 includes a new split pin 127b an a new nut 135. The new split-pin 127b has an upper stem 137 in which two pair of oppositely disposed flutes 139 are provided. A collar 141 extends from a shoulder at the top of the nut 135. The collar 141 has diametrically disposed circular holes 155. The nut 135 is fabricated with a locking cap 157 securely crimped into the holes 155. The locking cap 157 has a pedestal 159 from which a cylindrical shell 160 extends. the shell 160 is coaxial with, and encircles, the stem 137 having the flutes 139. As mounted on the flange 104, the new split-pin assembly 100 extends into the "mouse hole" 163 (FIG. 7) and is straddled by the edge of the wall 165 of the guide tube 113. In accordance with the invention a crimping tool 221 (FIGS. 3-17) provided for crimping the shell 160 into the flutes 137. The crimping must be such that the locking cap 157 joins the nut 135 and the split pin 127b so securely that rotation of one relative to the other under the forces exerted by the coolant of the reactor is precluded.

Figure 3:
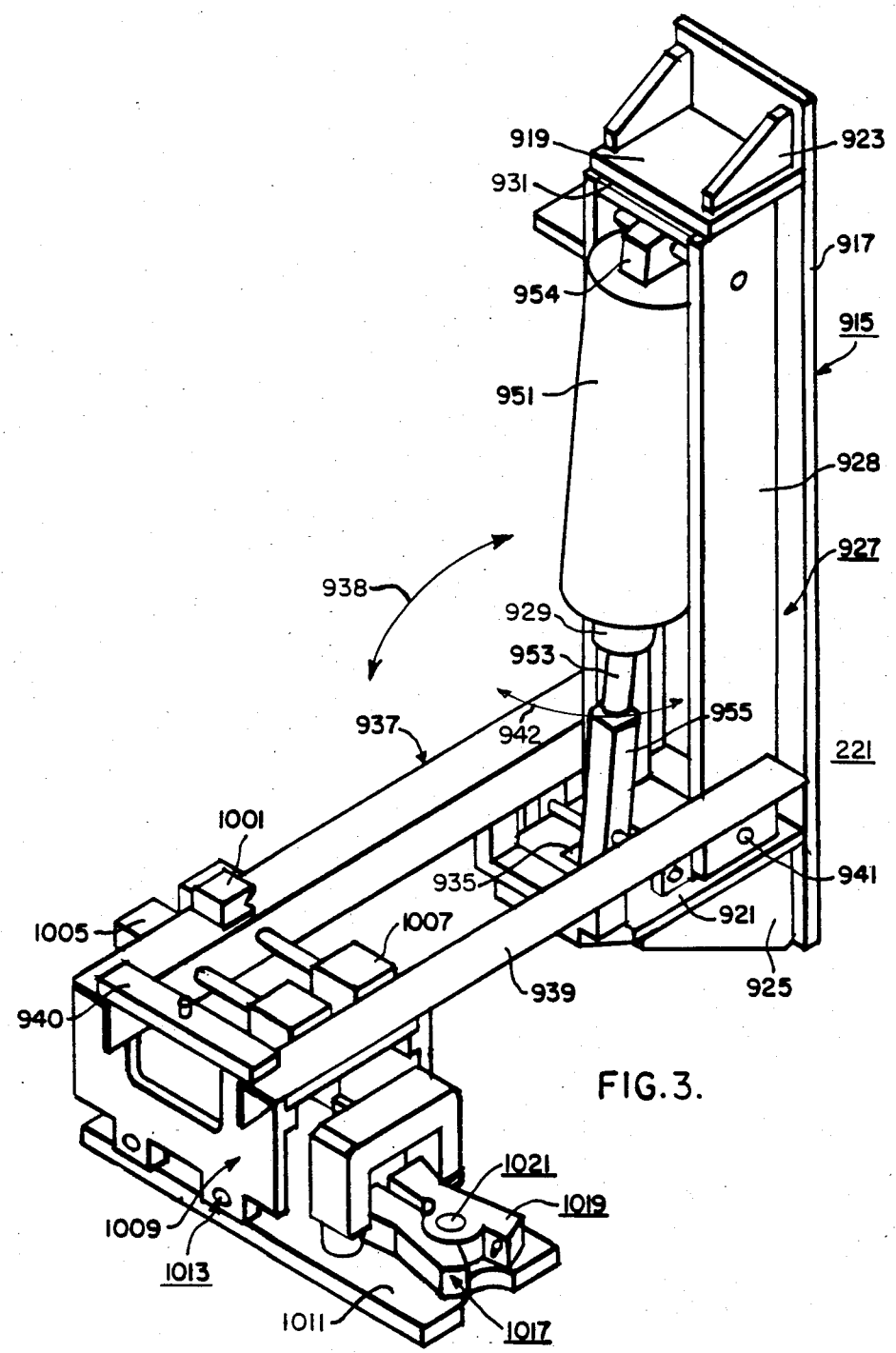
FIG. 3 is a simplified view in isometric showing generally the crimper tool in accordance with this invention in crimping partion with parts omitted for clarity.

The crimper tool 221 is provided for crimping the locking cap 167 to flutes 139 in the pin 127b. This crimper tool includes a support 915 formed of a vertical plate 917 having welded near its top and bottom horizontal plates 919 and 921 braced by trapezoidal plates 923 and 925. The vertical plate 917 is mounted on a cluster plate (not shown) which is in turn suspended from a strong-back (not shown) supporting the robotic tools, in the work station, which carry out the replacement of the old split-pin assemblies by the new split-pin assemblies (see Calfo). The plate 921 has a slot 935 (FIGS. 3, 9). A frame 927 having vertical sides 928 and 929 and horizontal sides 931 is mounted pivotal about a vertical axis on flanged bushings 933 (FIG. 9) secured to the top and bottom support plates 919 and 921 and engaging the horizontal sides 931 so that their centers define the pivot axis.

An angle support 937 (FIGS. 3, 4, 5) formed of angles 939 braced by a cross plate 940 is mounted pivotably at one end of the frame 927 on a pin 941 (FIG. 15) extending between the vertical sides 928 and 929. The pin rides in bushings 943 (FIG. 11) in the sides 928 and 929. The angle support 937 is pivotal on the pin 941 between the operating position shown in full lines in FIG. 4 and the retracted or storage position shown in broken lines. The angle support 937 carries a stop bracket 945 which engages adjustable stop bolts 947 (FIG. 4) extending upwardly near the ends transversely of the bottom plate 921 of the fixed support 915. Being suspended from the frame 927, the support 937 is also pivotal about the vertical axis about which the frame is pivotal. Arrow 938 (FIG. 3) shows the direction of the vertical pivoting movement of support 937 about pin 941 and arrow 942 shows the direction of the horizontal pivoting movement about the axis of the flanged bushings 933. The bracket 945 and the stops 947 prevent the angle support 937 from dropping below the plate 921. The angle support 937 also has an adjustable stop 949 (FIG. 4) which abuts the end of the top plate 919 when the angle support is in the retracted position. With reference to FIG. 4, the angle support 937 is pivoted vertically in the plane of the drawing and horizontally into and out of the drawing. It is to be realized that under certain circumstances the crimper tool 221 and the split-pin assembly may be oriented so that the frame is supported in another position than vertically and may be pivoted first directly out of this position and then in a direction transversely or laterally to the first direction.

The angle support 937 is pivotal between the operating and the retracted positions by a cylinder 951. The cylinder 951 is pivotally suspended on a pin 952 (FIG. 5) passing through a clevis 954 which is bolted to the upper side 931 of the frame 927. The piston rod 953 of the cylinder 951 has an extension 955 which carries a slot 957 (FIGS. 4, 9). The slot is engaged by a pin 959 carried by plates or tabs 961 (FIGS. 4, 11) welded to the angles 939. The pin 959 is secured in tabs 961 by cross pins 960. The pin 959 is positioned in the slot 957 between bronze bushings 962 in collars 964 (FIG. 10). Below the slot 957 and pin 959, the piston-rod extension 955 has a cam surface 963 (FIG. 10) which extends into slot 935 in bottom plate 921. The cam surface 963 (FIG. 10) is engaged by the tip of a bolt 965, which serves as cam follower, and which extends into the slot 935 & lower plate 921. The position of bolt 965 is adjustable. In any position, the bolt 965 is locked by nut 968 against plate 921.

With the angle support 937 in retracted position, the tabs 961 are in the position shown in broken lines in FIG. 4. With the sides (as distinct from the ends) of slot 957 in engagement with pin 959 so that the upper side of the slot can exert a downward force on the pin. Only tab 961 is shown in broken lines, pin and slot not shown. When the piston rod extension 955 is moved downwardly by actuation of cylinder 951, the tabs 961 are moved downwardly with the upper side of slot 957 and turned. The angle frame 937 is pivoted to the operating, generally horizontal, position and the tabs 961 are in the full line position shown in FIG. 4 (bottom). The movement of the angle frame 937 is stopped by engagement of bracket 945 with stop 947. With the angle frame in this position the pin 959 is engaged with the lower end of slot 957 as shown in FIG. 4 where the slot 957 is shown in broken lines. As the piston rod extension 955 now continues to be moved downwardly by cylinder 951, the slot 957 moves to the full-line position shown in FIG. 4A. Pin 959 remains fixed and angle support 937 remains horizontal. But during the movement of the slot to the full-line position shown in FIG. 4A, the angle support 937 is pivoted generally horizontally about the axis of bearings 933 by the coaction of pin 965 and cam surface 963 (FIG. 10). This motion is produced by the action of pin 959 against a side of slot 957.

A tension spring 967 (FIGS. 4, 12) connected between an anchor 969 at the inner end of plate 921 and an anchor 971 on the vertical side 928 of the frame 927 exerts a force pulling the frame 927 and the parts connected to it inwardly. Excessive displacement of the frame is prevented by a stop 973 (FIG. 12) engaging the other side 929 of the angle frame.

An angle bracket 975 (FIGS. 4, 5) is bolted to side 928 of the frame 927. The bolts securing the bracket 975 to side 928 pass through slots 977 so that the height of the bracket 975 is adjustable. A cylinder 979 is suspended from the horizontal member of the bracket 975. A latch 981 is pivotally suspended from the side 928 on a plurality of washers 983 (FIG. 5) and a bolt 984. The latch 981 has a flat tail-plate 985 which extends inwardly and a hook 987 which extends outwardly. Above the tail plate 985 a sleeve housing 989 is threaded into a horizontal plate 991 suspended from side 928. The position of the housing 989 is adjustable along plate 991 and the housing may be locked in any position by nuts 993. The lower part of the housing 989 is widened providing a shoulder between the upper and lower parts. A spring pin 994 having a tapered tip extends through the housing 989. The pin 994 has a shoulder from which a stem extends into the restricted portion of the housing. A compression spring 995 acts between the shoulder in the housing 989 and the shoulder on the pin, resiliently urging the pin downwardly into engagement with the upper surface of tail-plate 985 and pivoting the latch 981 counter-clockwise (as viewed in FIG. 4) on the pivot 984. The force of the spring is counteracted by the cylinder 979. This cylinder has an extension 997 on its piston rod 999 which engages the lower surface of tail-plate 985 and pivots the latch 981 clockwise. The angle support 937 carries a strike or hook 1001. When the angle support is retracted, the piston rod 999 of cylinder 979 is retracted so that the latch 981 is swung to its most counter-clockwise position engaging hook 1001 securing the angle support 937 and the components which it carries in the retracted position. When the angle support is to be set in the operating position, the piston rod 999 is extended rotating the latch 979 clockwise and disengaging hook 1001.

Near the end remote from the support, guide rails 1003 are secured to the vertical members of the angles 939 (FIGS. 4, 5) as seen in solid lines in FIG. 4. Two sets of pillow blocks 1005 and 1007 are slideable along the guide rails. The pillow blocks 1005 and 1007 support a carriage or housing 1009. The carriage 1009 supports a base plate 1011 on rods 1013 (FIGS. 4, 5). The rods 1013 penetrate through blocks 1015 welded to the base plate 1011 (FIG. 4). The base plate and the parts connected to it may be moved along the rods 1013 relative to carriage 1009 so that its position in the direction perpendicular to the axes of the rails 1003 (along the plane of FIG. 4 parallel to beams 939) may be set. The base plate 1011, once set, is secured in the set position by set screws 1016 (FIG. 5). Crimping jaws 1017 and 1019 are mounted pivotally on a pin 1021 secured near the outer end of the base plate. The pin 1021 is secured by a locking nut 1023 which is threaded onto the lower end of the pin 1021 and engages a washer 1025 between the nut and the plate 1011 (FIGS. 4, 5). At the top the pin 1021 is secured to an angle block 1027 by a cap screw 1029. A washer 1030 is interposed between the block 1027 and the pivoting bearings of the jaws but engages a shoulder on pin 1021 clearing the bearings. Another washer 1031 is interposed between the base plate 1011 and the pivoting bearings of the jaws and a shoulder on pin 1021.

Each guide rail 1003 carries a compression spring 1035 (FIG. 5). Each spring engages pillow block 1007 at one end and is engaged by a member 1037 clamped to the guide rail at the opposite end. The springs 1035 resiliently urge the pillow blocks 1007 and the parts connected to them including the base plate 1011 outwardly; i.e. away from plate 928; to the right as seen in FIG. 5. At its outer end, the base plate 1011 has a downwardly facing shoulder 1039 (FIG. 7). Above this shoulder the base plate terminates in a cylindrical surface 1041 (FIGS. 5 and 7) which has the same curvature as the nut 135 of the new split-pin assembly 127b. The relative position of the crimper tool 221 and the pin-insertion/torque tool on the strong-back (see Calfo FIG. 9B) is such that when the angle support 937 of the crimper tool 221 is moved to the operating setting (full lines FIG. 4) the coaction of the pin 965 and cam surface 963 (FIG. 10) advances (pivots about the axes of bushings 933) the base plate 1011 and the parts mounted on it inwardly with reference to support 915 (into the plane of the drawing as seen in FIG. 4) (to the right as seen in FIG. 3). The shoulder 1039 seats on the top of the flange 104 (FIG. 5) of the LGT 113, whose old split-pin assembly is replaced by new assemblies 100 (FIGS. 1, 2), and the cylindrical surface 1041 seats precisely against the new nut 135 (FIGS. 5, 7). The springs 1035 hold the surface 1041 in resilient engagement with the nut 135. The pin-insertion/torque tool is, during this operation, in the retracted position (761, FIG. 61 of Calfo) with the pin 127b on its blade (815, FIG. 64 of Calfo).

Near the outer end the pillow blocks 1007 engage a plate 1043 (FIG. 6) which is slideable on the rails 1003. This plate is connected to the carriage 1009. The position of the plate 1043, longitudinally of the rails 1003, is adjustable by bolts 1045 each of which is threaded into a boss 1047 on each angle 939 (FIG. 6). Each bolt carries a block 1049 at its inner end and may be locked in any position by a nut 1051. The position of the carriage 1009 and the parts connected to it including base plate 1011, longitudinal of the rails 1003, is thus adjustable.

Figure 13:
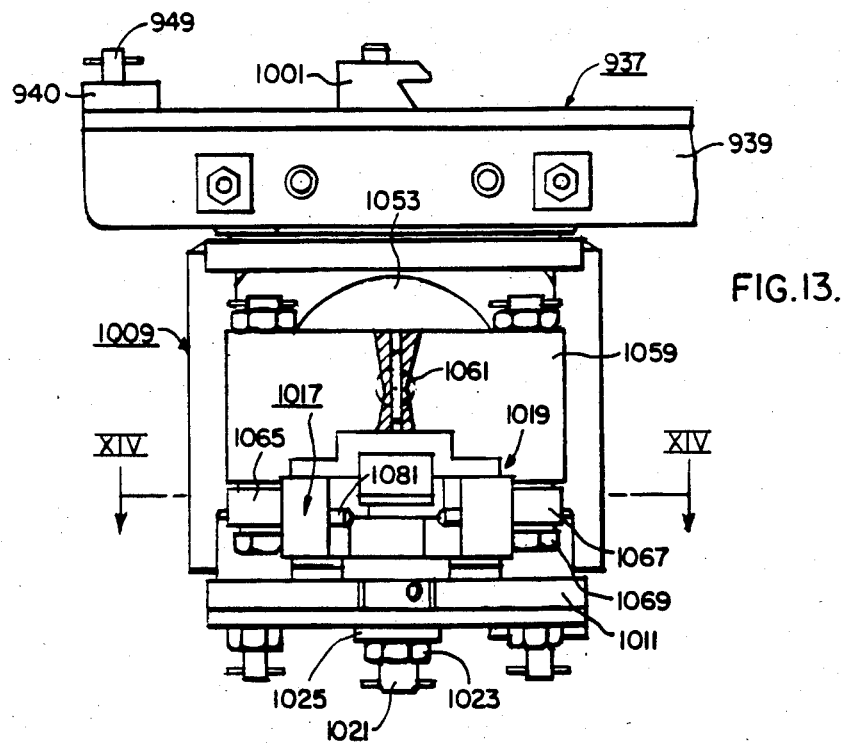
FIG. 13 is a fragmental view in end elevation, taken in the direction XIII of FIG. 5, showing the mechanism which produces the crimping.
Figure 14:
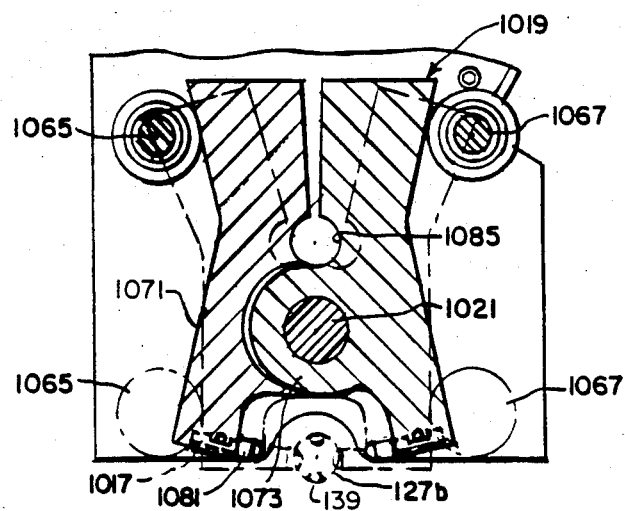
FIG. 14 is a fragmental view in transverse section taken along line XIV—XIV of FIG. 13.
Figure 15:
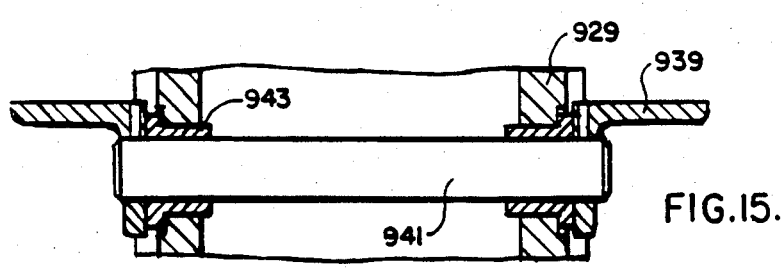
FIG. 15 is a fragmental view in section taken along line XV—XV of FIG. 4.

A cylinder 1053 (FIGS. 4, 13) is supported horizontally in carriage 1009 on an angle bracket 1055. This angle bracket is bolted to spacer blocks 1057 supported on base plate 1011. A bearing yoke or "C"-frame 1059 is mounted on an extension 1061 of the piston rod 1063 of the cylinder 1053 (FIGS. 5, 7, 13). The bearing yoke 1059 supports rollers 1065 and 1067 on bearing screws 1069. These rollers engage cam surfaces 1071 of the jaws 1017 and 1019. In FIG. 14, the rollers 1065 and 1067 are shown in full lines with the jaws in the retracted position and in broken lines with the jaws in the crimping position.

Figure 16:
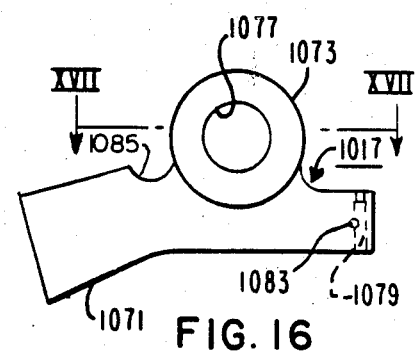
FIG. 16 is a plan view of a crimping jaw used in the crimper tool.
Figure 17:
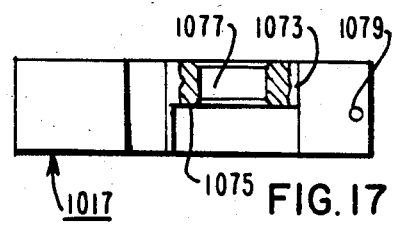
FIG. 17 is a view in section, taken in the direction XVII—XVII of FIG. 16 showing a fragment of the crimper tool housing .

The blank for jaw 1017 is shown in FIGS. 16 and 17. This jaw includes a circular hub 1073 from which arms extend. The opening in the hub is constricted at one end providing a shoulder 1075 (FIG. 17). Jaw 1019 is interlocked with jaw 1017, the constricted portion of its hub seated in the expanded portion of the hub of jaw 1017 and its lateral surface engaging shoulder 1075. The openings 1077 in the jaws are coaxial and are engaged by pin 1021 (FIGS. 5, 7). The arms of the jaws extending on each side of the hub have the cam surface 1071 on one side. Near one end each of the jaws 1017 and 1019 has an opening 1079 for a crimping pin 1081 (FIG. 14). At the same end there is an opening 1083 perpendicular to opening 1079 for a locking pin (not shown) for the crimping pin 1081. The cam surfaces 1071 have a contour such that the crimping jaws are open with the rollers 1065 and 1067 retracted (full lines FIG. 14) and closed with the rollers advanced (broken lines FIG. 14). The semi-circular extension 1085 of each hub 1073 affords clearance for the closing of the jaws.

During standby the angle support 937 is latched in the retracted position shown in broken lines in FIG. 4. When a crimping operation is to take place, the LGT is positioned with one of its new split-pin assemblies oriented for crimping and the support 937 is unlatched by remote actuation of cylinder 979 (FIGS. 4, 5). Cylinder 951 (FIG. 5) is then actuated, remotely first to lower the support 937 vertically, then to swing the support horizontally (to the right as seen in FIG. 3 and into the plane of the drawing as seen in FIG. 4). The base plate 1011 is positioned with its shoulder 1039 seated on the top surface of the flange 104 of the LGT which is to be processed and its cylindrical surface 1041 is seated against the surface of the new nut 135. The crimping pins are in position to crimp the cylindrical portion 160 of the locking cap 171 into opposite flutes 139 of the new split pin 127b. The LGT 113 is so positioned that a pair of opposite flutes 139 of one of its new split-pin assemblies 100 is oriented to receive the crimped projections of the cylindrical portion 160 of the locking cap 157. Cylinder 1053 is now actuated to cause the crimping pins 1081 to engage the portion 160 and crimp it onto the opposite flutes. The flutes preclude the necessity, which would be involved in indentations, of precisely positioning the jaws 1017 and 1019 vertically to effectuate the crimping operation.

While a preferred embodiment and preferred practice of this invention is disclosed herein, many modifications thereof are feasible. This invention is not to be restricted except insofar as is necessitated by the spirit of the prior art.

What I claim is:

1. A crimping tool for use in replacing the old split-pin assemblies of a guide tube of a nuclear reactor by new split-pin assemblies, each of said new split-pin assemblies including a new split-pin secured to said guide tube by a new nut, said new nut having a locking cap secured thereto, said locking cap to be crimped onto said new split pin, the said new split-pin assembly being in position to be processed, said crimping tool having a crimping mechanism, a support for said crimping mechanism, said support being in the standby state of said tool, in generally vertical position, a drive, a driven member, connected to said drive, movable by said drive over a predetermined path, means, connecting said driven member to said support, to move said support vertically from said generally vertical position to a generally horizontal position, as said driven member is driven by said drive along a first part of said path, and cam means, cooperative with said driven member, as said driven member is driven over a succeeding second part of said path, actuable, when said support is in generally horizontal position, for moving said support generally horizontally to set said crimping mechanism in position, relative to said split-pin assembly positioned to be processed, to crimp said locking cap onto said split pin.

2. A crimping tool for use in replacing the old split-pin assemblies of a guide tube of a nuclear reactor by new split-pin assemblies, each of said new split-pin assemblies including a new split pin secured to said guide tube by a new nut, said new nut having a locking cap to be crimped to said new split pin, the said new split-pin assembly being positioned to be processed, said crimping tool having a crimping mechanism, a support for said crimping mechanism, and means, connected to said support, for displacing said support between a retracted position and an operating position where a crimping operation is carried out, said displacing means including, first means, operative during a first phase of full operation of said displacing means, for moving said support, in a first direction generally defined by a first plane, from said retracted position to an intermediate position and second means, operative automatically during a second phase of full operation of said displacing means succeeding said first phase, for moving said support, from said intermediate position to said operating position, in a second direction generally defined by a second plane generally transversely to said first plane, said crimping mechanism, in said operating position, being in position, relative to said positioned new split-pin assembly, to crimp said locking cap to said new pin 3. The crimping tool of claim 2 wherein the displacing means include a fluid actuable cylinder having piston-rod means, said first moving means including first means, cooperative with said piston-rod means, as it is advanced, by said cylinder, during the first phase, along a part of its throw, for moving the support from the retracted position to the intermediate position and the second moving means including second means, cooperative with said piston-rod means, as it is advanced by the cylinder, during the second phase, along a second part of its throw, for moving said support between the intermediate position and the operating position.

4. The crimping tool of claim 2 wherein the crimping mechanism has crimping jaws mounted pivotally with reference to each other, on a common pivot pin, each jaw having externally a cam surface and internally, near one end thereof, crimping pins, said jaws being mounted with their crimping pins face-to-face, a cam follower in engagement with the cam surface of each said jaw and means, connected to said cam followers, for advancing said cam followers, between a position in which said pins are spaced from crimping position and a position in which said pins are in crimping position.

5. A crimping mechanism for a crimping tool including crimping jaws, said jaws being mounted pivotal on a common pivot pin, each jaw having a cam surface externally and a crimping pin internally near one end thereof, means, mounting said jaws pivotal with reference to each other, with their crimping pins face-to-face, said jaws being pivotal between a first setting in which said pins are retracted and a second setting in which said pins are in crimping position, a cam follower in engagement with each cam surface, and means, connected to said cam followers, for actuating said cam followers to move said jaws between said first and second settings.

6. The crimping mechanism of claim 5 wherein the cam-following means is a fluid cylinder.

7. A crimping tool for use in replacing the old split-pin assemblies of a guide tube of a nuclear reactor by new split-pin assemblies, each of said new split-pin assemblies including a new split pin secured to said guide tube by a new nut, said new nut having a locking cap secured thereto, said locking cap to be crimped into said new split pin, the said new split-pin assembly to be in an operating position where the crimping operation is to be carried out, said crimping tool including a crimping mechanism, a fluid-actuable cylinder, connected to said support, for displacing said support between a retracted position and said operating position, said fluidactuable cylinder having piston-rod means, said displacing means including, first means cooperating with said piston-rod means, as said piston-rod means is advanced by said cylinder along a first part of its throw, for moving said support, between said retracted position and an intermediate position, in a first direction generally defined by a first plane, said second means, cooperative with said piston-rod means, as said piston-rod means is advanced by said cylinder along a second part of its throw, for moving said support between said intermediate position and said operating position, in a second direction generally defined by a second plane generally transverse to said first plane, said crimping mechanism being, in said operating position, in position, relative to said positioned new split-pin assembly, to crimp said locking cup to said new split pin, said second cooperative means including cam means, actuable by said piston-rod means, for converting the response of said support to the action of said piston-rod means from movement generally in a direction generally defined by said first plane into movement generally in a direction generally defined by said second plane.

8. The crimping mechanism of claim 5 wherein each crimping jaw has a hub, each hub having an opening therethrough, the hubs being formed so that they interlock with the said openings in the hubs coextensive, the common pivot pin passing through said coextensive openings.

* * * * *